United States Patent
Auslander (10) Patent No.: US 6,905,538 B2
(45) Date of Patent: Jun. 14, 2005

(54) INVISIBLE INK JET INKS

(75) Inventor: Judith D Auslander, Westport, CT (US)

(73) Assignee: Pitney Bowes Inc., Stamford, CT (US)

( * ) Notice: Subject to any disclaimer, the term of this patent is extended or adjusted under 35 U.S.C. 154(b) by 126 days.

(21) Appl. No.: 10/331,829

(22) Filed: Dec. 30, 2002

(65) Prior Publication Data

US 2004/0123771 A1 Jul. 1, 2004

(51) Int. Cl.[7] .................... C09D 11/00; C09K 11/06
(52) U.S. Cl. .................... 106/31.15; 106/31.32; 252/301.16; 252/301.36; 252/301.4 R
(58) Field of Search .................... 106/31.15, 31.32; 427/157; 252/301.36, 301.16, 301.4 R (56) References Cited

U.S. PATENT DOCUMENTS

| | | | |
|---|---|---|---|
| 4,921,534 A | * 5/1990 | Jalon | 106/31.15 |
| 5,118,349 A | * 6/1992 | Jalon | 106/31.15 |
| 5,502,304 A | 3/1996 | Berson et al. | |
| 5,525,798 A | 6/1996 | Berson et al. | |
| 5,542,971 A | 8/1996 | Auslander et al. | |
| 5,569,317 A | 10/1996 | Sarada et al. | |
| 5,684,069 A | 11/1997 | Auslander | |
| 5,693,693 A | 12/1997 | Auslander et al. | |
| 5,755,860 A | * 5/1998 | Zhu | 106/31.15 |
| 5,837,042 A | 11/1998 | Lent et al. | |
| 6,149,719 A | 11/2000 | Houle | |
| 6,402,986 B1 | 6/2002 | Jones, II et al. | |
| 6,458,294 B2 | 10/2002 | Oshima et al. | |
| 2002/0028347 A1 | * 3/2002 | Marrocco et al. | 428/690 |
| 2003/0089273 A1 | * 5/2003 | Potrawa | 106/31.15 |
| 2003/0106460 A1 | * 6/2003 | Imanishi et al. | 106/31.14 |

FOREIGN PATENT DOCUMENTS

| | | | |
|---|---|---|---|
| JP | 53140105 A | 12/1978 | |
| JP | 01135683 A | 5/1989 | |
| JP | 2000/144029 A | 5/2000 | |
| JP | 2002/348508 A | 12/2002 | |

OTHER PUBLICATIONS

Information–Based Indicia Program (IBIP)—Performance Criteria For Information–Based Indicia And Security Architecture For Open IBI Postage Evidencing Systems (PCI-BI–O) Draft, Feb. 23, 2000.

* cited by examiner

*Primary Examiner*—Mark L. Bell
*Assistant Examiner*—Veronica F. Faison
(74) *Attorney, Agent, or Firm*—Charles R. Malandra, Jr.; Angelo N. Chaclas (57) ABSTRACT

Water-based invisible red fluorescent inks provide machine-readable, inverse contrast invisible images and can be printed using conventional ink jet printers. The inks employ rare earth complexed ligand fluorophores having narrow excitation and emission spectra. In one embodiment the images are printed with an ink comprising water and a water-soluble organic fluorescent fluorophore, which when printed and dried on paper is invisible to the eye and fluoresces in the green to infrared range, e.g., from about 550 to 1200 nm, when irradiated with short wave length UV radiation, e.g., from 230 nm to 280 nm. The highly specific excitation and emission rates, coupled with a high inverse contrast on papers of all colors, makes them particularly useful as ink jet inks for postal and other purposes.

20 Claims, 3 Drawing Sheets

INVISIBLE INK JET INKS

BACKGROUND OF THE INVENTION

The invention relates to invisible inks that can form inverse-contrast, machine-readable images using conventional ink jet printers and that are useful in a process that enables enhanced readability of Information-Based Indicia (IBI) images especially on traditionally low-contrast papers.

A wide variety of paper types is available for postal uses, but the variation in available colors and inks can cause readability problems when printing with visible inks for both manual and machine reading. While those skilled in the postal arts are aware that some color combinations can decrease print contrast to marginal levels, the reliability of routine mailing is largely subject to color and paper selection made for reasons of taste and economy. It would be desirable to have an ink and a process that would permit machine readability largely independent of paper color.

Typically, reflectance of printed images is the primary basis for both visual and machine readability. In other words, when visible light hits an address block on an envelope, either a human or a machine attempts to read the address information based on the reflectance of light—typically a dark print image reflecting less light than a light-colored envelope. In these systems, contrast between printed and unprinted areas will determine readability. Because there is a wide variability in envelope color, the use of reflectance can never be ideal. It would be desirable to have an ink and a process that provided better readability over a wide range of paper colors.

Information-Based Indicia (IBI) images are becoming increasingly important for security and address information purposes. IBI images are composites comprised of 2-D bar code information, typically comprising postage information, and human-readable postage information, which typically includes address information. The images can be printed utilizing open systems using conventional ink jet printers. Reliability is a major concern, and there is a need to improve the reliability of machine reading these images.

Invisible inks have been utilized to some extent in the past for printing machine-readable 2-D bar codes, but inks as typically employed often possess excitation and emission spectra that overlap with optical brighteners (and other sources of fluorescence indigenous to a particular system) used in envelopes and for other practical purposes. Moreover, printing of 2-D bar code IBI images with invisible inks has been less than refined because available inks typically have poorly defined excitation and emission spectra and are not water-based suitable for inkjet printing. The available inks do not function well in providing highly-reproducible prints for reverse contrast reading utilizing short wavelength ultraviolet (UV) light for excitation causing fluorescence in the visible range, e.g., green and red through infrared regions. While some systems employ invisible inks in combination with inks visible to the human eye, including for printing 2-D bar code IBI images, few are available for producing reliably readable images by ink jet printing.

Some prior art procedures use invisible inks along with visible inks. For example, in U.S. Pat. No. 5,502,304, Berson, et al., describe a system that employs upper and lower bar codes in a format that provided a degree of security. The lower layer bar code is written on an object with a visible dark ink and an upper layer bar code is written over the lower layer bar code with an ink that is invisible to the naked eye. A detector apparatus is described for reading both bar codes in a manner that detects authenticity. And, in U.S. Pat. No. 5,525,798, Berson, et al., describe inks that are selectively excitable by different wavelengths of incident radiation. The invisible inks in both cases, however, had relatively broad ranges of excitation and emission.

In U.S. Pat. No. 5,693,693, to Auslander, et al., wax-based invisible inks are described that emit light at various wavelengths in the visible region when they are excited by UV light. This allows lower layer clear text information to be written on an object with a regular, visible ink and an upper layer bar code to be written over the lower layer text information with an ink that is invisible to the naked eye. In this manner, more information can be provided than with conventional bar codes. However, the inks were not water-soluble. In U.S. Pat. No. 5,684,069, to Auslander, an invisible ink is described that utilizes a substituted phthalocyanine dye in combination with selected waxes and resins. The ink is useful in thermal printing, not ink jet printing and is responsive to infra-red light in the range of 720 to 1000 nm.

Inks that are selectively excitable by different wavelengths of incident radiation are described by Auslander, et al., in U.S. Pat. No. 5,542,971. The use of these inks allows a lower layer bar code to be written on an object with a dark visible ink and an upper layer bar code to be written over it with an invisible ink. In this manner, the lower layer and upper layer bar code can contain more information than conventional bar codes. The invisible inks used are based on complexes of rare earth elements with an atomic number higher than 57 such as: Eu, Gd, Tb, Sm, Dy, Lu with various chelating agents providing chromophore ligands that absorb in the ultraviolet and the blue region of the spectra such as: $\beta$-diketones, dipicolinic acid, etc.

Yet other invisible fluorescent jet inks are described in U.S. Pat. No. 5,837,042, to Lent, et al. The inks are said to be suitable for producing security markings. The jet ink compositions comprise a fluorescent colorant, an ink carrier, and optionally one or more binder resins. The markings are invisible to the unaided eye and are visible only when excited by ultraviolet light. The colorant comprises a rare earth metal and a chelating ligand, is excitable by ultraviolet light having a wavelength of from about 275 nm to about 400 nm, and fluoresces at a wavelength of from about 550 nm to about 700 nm. The chelates can comprise a rare earth metal such as europium, dysprosium, or terbium.

U.S. Pat. No. 6,402,986, to Jones, II, et al., describes compositions said to be different from those of Lent, et al. The compositions are used in methods for the verification of products or documents based on the reading of emitted light from luminescent compositions that can be incorporated or applied to a wide variety of materials. The compositions are luminescent at various wavelengths, displaying qualities of image, wavelength, and time scale for the measure of luminesce decay. The light emitted from the composition, and specifically, the measure of the variable and adjustable luminescence lifetimes provides a multi-parameter signature for purposes of comparative light decay analysis of verification marks or features. They note that the 1,3-diketone ligands of Lent, et al., do not show long term stability to light, and describe other compositions based on metal chelates wherein three ligands are bound to the metal.

In U.S. Pat. No. 6,149,719, Houle describes light-sensitive invisible ink compositions and methods for using them. The disclosed system generates high-definition, light-fast images that are easily read or otherwise detected using far red, infrared, and/or ultraviolet light. The inks contain an uncomplexed invisible metal phthalocyanine far red/infrared fluorophore (optimally chloroaluminum[III]phthalocyanine tetrasulfonic acid or salts thereof). An ultraviolet fluorophore can also be included. The inks are invisible to the unaided eye, but when exposed to far red or infrared light (wavelength=about 650–715 nm) they fluoresce at a wavelength of about 670–720 nm. When an ultraviolet fluorophore is employed, the inks can also be detected by applying ultraviolet light (wavelength=about 250–380 nm) which results in fluorescent emission at a wavelength of about 400–650 nm. The inks are said suited for forming invisible images using inkjet technology. In U.S. Pat. No. 6,458,294, Oshima, et al., describe a fluorescent substance useful in ink jet inks containing both an Ln composition, which includes at least one element selected from the group consisting of Nd, Yb and Er and another element selected from the group consisting of Y, La, Gd, Bi, Ce, Lu, In and Tb at a ratio within the range of 0.01 to 0.99.

There remains a need for water-based invisible inks having narrow excitation and emission spectra that can produce highly-reliable inverse-contrast, machine-readable IBI images using conventional ink jet printers.

BRIEF DESCRIPTION OF THE DRAWINGS

The invention will be better understood and its advantages will become more apparent from the following description, especially when read in light of the accompanying drawing, wherein.

SUMMARY OF THE INVENTION

It is an object of the invention to provide a water-based invisible ink that can be printed using conventional inkjet printers.

It is another object of the invention to provide a method for printing invisible images utilizing a water-based ink and conventional inkjet printers.

It is another and more specific object of the invention to provide water-based inkjet inks having narrow excitation and emission spectra that clearly differentiate them from the optical brighteners (and other sources of fluorescence indigenous to a particular system) used in envelopes and for other practical purposes.

It is another object of the invention to provide a major improvement in this regard to enable inkjet printing of 2-D bar code IBI images with a water-based invisible ink having defined excitation and emission spectra.

It is yet another object of the invention to provide inks and processes that enable forming highly-reproducible prints for reverse contrast reading utilizing short wavelength ultraviolet (UV) light for excitation causing fluorescence in the visible range, e.g., green and red through infrared regions.

It is another more specific object of the invention to enable enhanced readability of Information-Based Indicia (IBI) images especially on traditionally low-contrast papers.

It is another object of the invention to provide an ink and a process that would permit readability largely independent of paper color.

It is another object of the invention to provide an ink and a process enabling better readability over a wide range of paper colors.

It is another object of the invention to provide water-based inkjet inks having narrow excitation and emission spectra that clearly differentiate them from the optical brighteners (and other sources of fluorescence) used in envelopes and for other practical purposes.

It is another object of the invention to enable a major improvement in readability through the use of inkjet printing of IBI images with a water-based invisible ink having defined excitation and emission spectra.

It is another object of the invention to provide invisible inks that fluoresce sharply and with good fluorescent intensity when irradiated with short wave length UV radiation and provide sharply defined inverse contrast images on colored papers.

It is another object of the invention to provide invisible inks that are highly stable against degradation under exposure to UV radiation.

It is another object of the invention to enable forming highly-reproducible prints for reverse contrast reading utilizing short wavelength ultraviolet (UV) light for excitation causing fluorescence in the visible range, e.g., green and red (through infrared) regions.

It is another object of this invention to provide stable contrast with respect to a non reflecting substrate (paper under UV light is consistently black).

It is another and more specific object of this invention to provide an additional use of facer cancellers used for postal facing in countries such as US and Canada which are based on recognizing red fluorescent signal for metered indicia and green phosphorescent signal for stamps.

It is another and more specific object of this invention to provide inks that can be used for a dual purpose, wherein, in addition to use for postal facing, they can be used for security verification of IRF printed codes and their authentication to enable full utilization of equipment that is often under utilized after initial large investments.

These and other objects are accomplished by the invention, which provides both a water-based invisible ink that can be printed using conventional ink jet printers and a method for printing invisible utilizing.a water-based ink and conventional inkjet printers, including: bubble jet, piezo and continuous ink jet printing.

The ink compositions of the invention comprise: water and a water-soluble metaloorganic fluorophore (component that generates fluorescence or phosphorescence), which when printed and dried on paper is invisible to the eye at the concentrations employed and fluoresces when irradiated with short wave length UV radiation, e.g., from 230 nm to 400 nm. Preferably the inks provide fluorescent images within a wavelength range of above 550 nm, e.g., from 610 to 630 nm. In addition, the inks preferably include materials to aid in better fluorophore solubilization, paper penetration and/or drying. Among these materials are polar solvents, surface active agents, humectants, and the like.

The method of the invention comprises: printing an image utilizing an ink as defined above and then subjecting the ink to short wave ultraviolet radiation and reading the reverse of the printed image by machine reading means. Preferably the reader is preset to read fluorescent images within a wavelength range of above 550 nm, e.g., from 610 to 630 nm.

The compositions and methods of the invention have a number of preferred aspects, many of which are described below and shown in the attached drawings.

DETAILED DESCRIPTION OF THE INVENTION

The invention relates to both a water-based invisible ink that can be printed using conventional inkjet printers and a method for printing invisible images adapted to machine reading as inverse contrast images utilizing these inks and conventional inkjet printers. The inks are invisible to the eye and under long wavelength ultra violet (UV) radiation when printed in machine-readable format by inkjet printing. Advantageously, they fluoresce sharply and with good fluorescent intensity when irradiated with short wave length UV radiation. They are also stable against degradation under exposure to UV radiation and exhibit a characteristic contrast decay.

While the invention has broader utility, the following description will detail preferred forms wherein a conventional ink jet printer is utilized to print images. It will be recognized, however, that other printers capable of utilizing inks having the advantages of the invention can be employed. The inkjet printers useful according to the invention include all conventional ink jet printer, such as any of the Cannon Bubble Jet®, Hewlet Packard DeskJet®, IBM®, Epson® or Xerox® ink jet color printers.

Inks according to the invention for use as ink jet inks are stable chemically in aqueous solution and have effective viscosity and surface tension characteristics to assure satisfactory operation of the designated type of ink jet printer. Printers can be of the piezoelectric or bubble type. The viscosity of the liquid inks used in current piezoelectric inkjet printers is typically from 1.5 to 20 centipose (cps) and in the thermal ink jet printer is lower, e.g., from 1 to 5 cps. The desirable surface tension of liquid ink jet printer inks will typically be between 30–45 dynes/cm.

The inks will comprise a water-soluble organic fluorescent fluorophore (meaning a component that generates fluorescence or phosphorescence) comprised of water and a fluorophore, which when printed and dried on paper is invisible to the eye at the concentrations employed and fluoresces when irradiated with short wave length UV radiation, e.g., from 230 nm to 280 nm. For the purposes of this description, the fluorescent component is referred to herein as a fluorophore because it is not a pigment in the true sense of imparting a color to the substrate on which it is printed—it is preferably invisible or virtually so. In addition, the inks preferably include various materials to aid in fluorophore dispersion, paper penetration and drying in effective amounts for these purposes, particularly in inks suitable for ink jet printing. Among these materials are polar solvents, surface active agents, humectants, and the like.

Among the polar solvents are triethylene glycol mono butyl ether (BTG), tripropylene n-butyl ether, diethylene glycol monobutyl ether, diethylene glycol methyl ether, dipropylene glycol methyl ether, tripropylene glycol methyl ether and other glycol ethers. Among other things, these solvents are employed in amounts effective to facilitate rapid penetration of the ink into a paper substrate. In some cases, they also inhibit microbiological growth, an advantage in aqueous systems.

Among the surface active agents are anionic surfactants such as sodium alkyl sulfonates, cationic surfactants such as cetyl trimethylammonium bromide, zwitterionic surfactants such as sulfobetaines, and non ionic surfactants such as alkyl polyethylene oxides (e.g., available as Igepals), non-ionic acetylenic diol surfactants (e.g., surfinols), etc. Among other things, the surface active agents are employed in amounts effective to facilitate uniform dispersion of ingredients through contact with a paper substrate and drying.

Among the humectants and organic water soluble solvents are 2-Pyrrolidone, polyethylene glycol (PEG), glycerine, triethylene glycol, ethylene, glycol, propylene glycol, diethylene glycol and other water-soluble polyhydric alcohols. Among other things, these humectants are employed in amounts effective to inhibit loss of solvent and consequent precipitation of fluorophore or buildup of solids on print mechanisms, facilitate penetration of the ink into a paper substrate and/or control drying. In some cases they also inhibit microbiological growth in aqueous systems.

Figure 1:
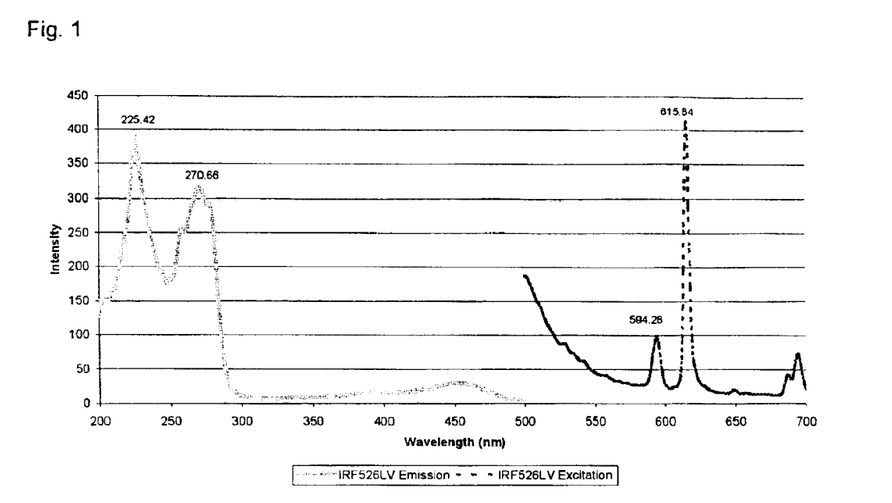
FIG. 1 is a graph showing excitation and emission spectra data for an invisible red fluorescent (IRF) ink of Example 1.

Suitable fluorophores will have very narrow excitation and emission bandwidths. Preferably, the fluorophore is only excited by short UV radiation (e.g., 230 nm–280 nm) and under long UV radiation a print made from it remains invisible. FIG. 1 is a graph showing excitation and emission spectra data for an invisible red fluorescent (IRF) ink of Example 1.

Figure 2:
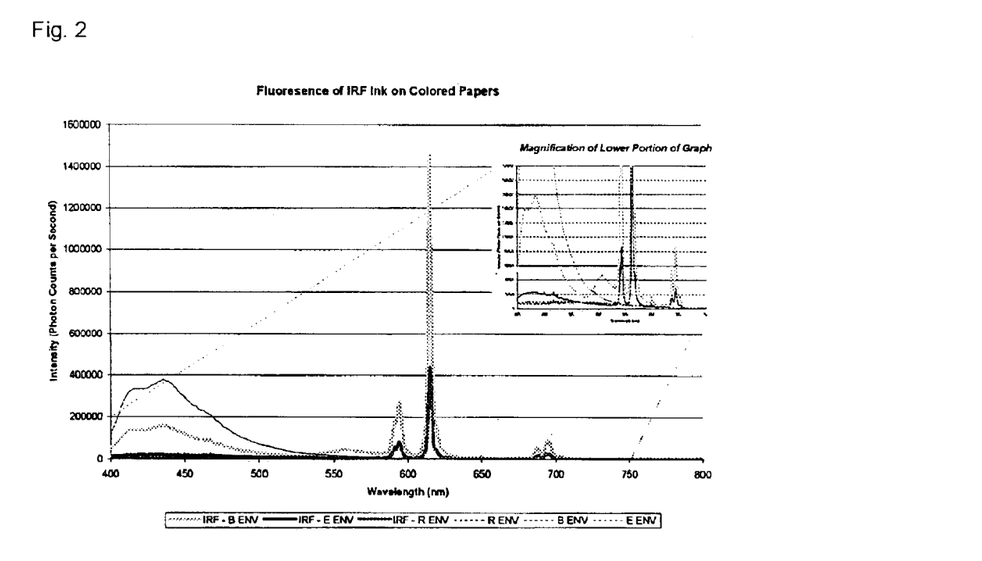
FIG. 2 shows contrast in reflectance mode between paper and invisible inks of the invention, illustrating an advantage of the invention that the near constant background for the papers, coupled with the sharp peak fluorescence for the invisible inks provides a very high contrast independent of paper color.
Figure 5:
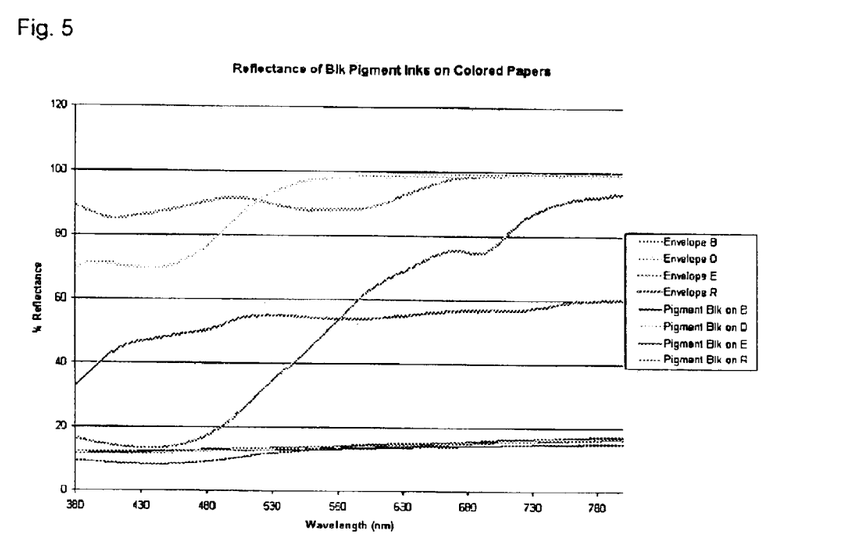
FIG. 5 is presented for comparison and shows reflectance of black pigmented inks on colored papers and, when taken with FIG. 2, illustrates a fundamental difference between regular (black and white) and fluorescent contrast, namely that there is less variation for negative contrast.

An advantage of the inks of the invention is that they show sharp inverse contrast on papers of many colors and are effective over a wide range of paper qualities and porosities. Illustrating this is FIG. 2, which shows contrast in reflectance mode between paper and invisible inks of the invention, illustrating an advantage of the invention that the near constant background for the papers, coupled with the sharp peak fluorescence for the invisible inks provides a very high contrast independent of paper color. Note that the papers referenced are standards wherein a "B" envelope is a regular white wove, an "E" envelope is a yellow (manila) kraft envelope, and an "R" envelope is a recycled paper envelope. FIG. 5 is presented for comparison and shows reflectance of black pigmented inks on colored papers and, when taken with FIG. 2, illustrates a fundamental difference between regular (black and white) and fluorescent contrast, namely that there is less variation for negative contrast. The only apparent limitation on the readability of the inks of the invention occurs with papers, such as E which are too porous.

To better explain this limitation on porosity, it is noted that there are several tests for porosity, including Sheffield porosity and Cobb Sizing. The Sheffield porosity of envelopes can be obtained by using a TMI Smoothness tester and averaging the results of five readings. The tester measures the time it takes for a fixed volume of air to pass through a single layer of paper. Higher values indicate a more porous surface. Cobb Sizing is performed in accordance with TAPPI 441 om-90 with apparatus provided by Gurley Instruments. Cobb Sizing is a measure of the water absorbtivity of the paper and is measured by placing a fixed amount of water, on a fixed area of paper, for a fixed time and measuring the weight gain associated. Below are representative values by both tests for the above envelopes and a "D" envelope, which is a yellowish bond.

| Envelope Type | Sheffield smoothness (ml/cm2) | Sheffield Porosity (ml/cm2) | Cobb Sizing (Water Absorbed g/m² ) time = 60 seconds |
| --- | --- | --- | --- |
| B | 219.3 | 122 | 158 |
| D | 400+* | 104 | 56 |
| E | 245.2 | 166 | 68 |
| R | 302.7 | 113 | 209 |

*Out of range of equipment (Testing Machines Inc Smoothness Tester).

These results indicate that the Sheffield porosity should be under 166 for best results and can, for example, be under 150, with very good results being achieved at 122 and below.

Figure 3:
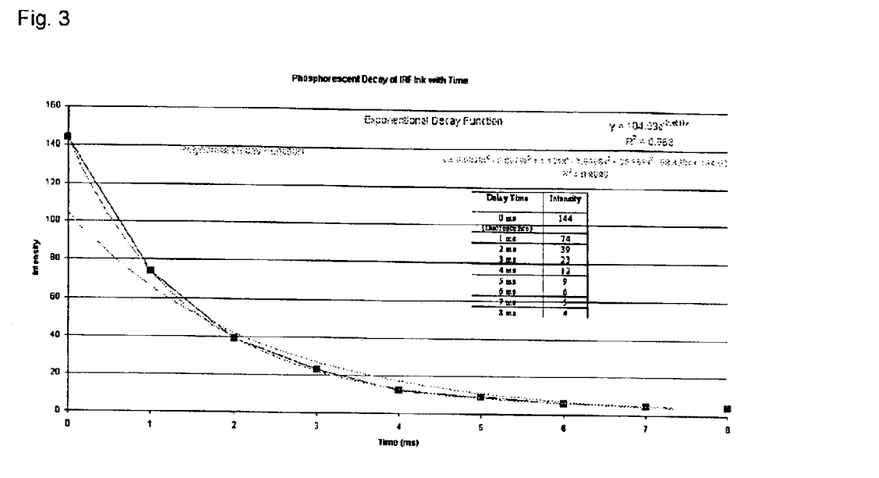
FIG. 3 is a graph showing phosphorescent decay of an invisible red fluorescent ink of the invention.
Figure 4:
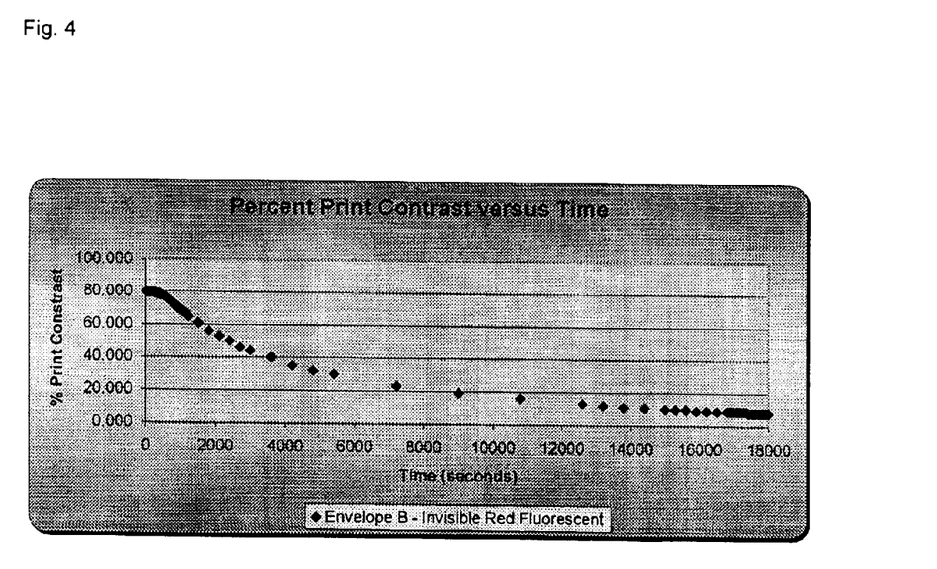
FIG. 4 shows the luminescence decay for an IRF ink that can be defined as "delayed fluorescence" or "short lived phosphorescence"

The fluorescence is preferably very stable, not decreasing in fluorescent signal significantly over time, e.g., from a drawdown on a "B" envelope after one month, wherein the fluorophore comprises a water-soluble organometallic fluorophore complexed ligand comprising a rare earth element. FIG. 3 is a graph showing phosphorescent decay of an invisible red fluorescent ink of the invention. It is an advantage of the invention that the decay rate, typifying a particular fluorophore, can be used in the method of the invention by employing a machine reading means programmed with exponential decay parameters for the ink and compares the fluoresced image to a standard as an additional security attribute in addition to comparison of the wavelength of emission and negative contrast values to predetermined standards. FIG. 4 shows the luminescence decay for an IRF ink that can be defined as "delayed fluorescence" or "short lived phosphorescence". Desirably, the rare earth element comprises europium or terbium. One suitable water-soluble organic fluorescent fluorophore meeting the above criteria is available as Lumilus Red CD380 from Riedel de Haen. This fluorophore is very readily soluble in aqueous systems (860 g/L) and dissolves very rapidly in distilled water.

Invisible images according to the invention can be printed in a format effective for machine reading. The inks are fluorescent, having defined excitation and emission spectra. Advantageously, they fluoresce sharply and with good fluorescent intensitywhen irradiated with short wave length UV radiation. Also, they are highly stable against degradation under exposure to UV radiation.

Figure 6:
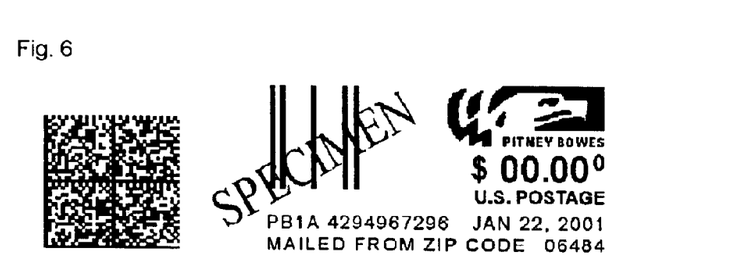
FIG. 6 is an example of a mailpiece carrying a bar code that can be printed with the invisible red fluorescent ink of the invention.
Figure 7:
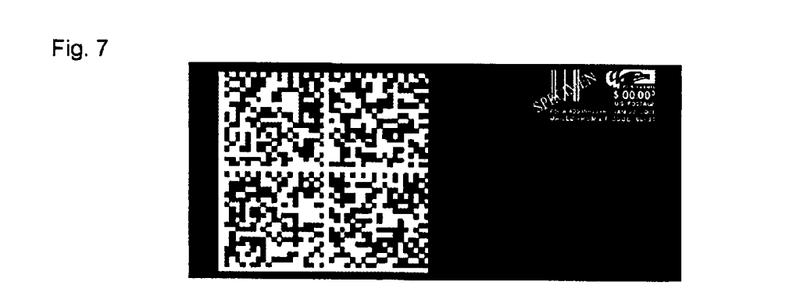
FIG. 7 is a schematic representation of the negative image obtained by illuminating a bar code of the type illustrated in FIG. 6 with ultraviolet light.

FIG. 6 is an example of a mailpiece carrying a bar code that can be printed with the invisible red fluorescent ink of the invention. FIG. 7 is a schematic representation of the negative image obtained by illuminating a bar code of the type illustrated in FIG. 6 with ultraviolet light.

It is another advantage of the invention that the inks enable forming highly-reproducible prints for reverse contrast reading utilizing short wavelength ultraviolet (UV) light for excitation causing fluorescence in the visible range, e.g., green and red (through infrared) regions. In some embodiments, the inks will fluoresce in the range of from 610 to 630 nm. In others, they will fluoresce in the range of from 550 to 650 nm. And, in yet others, they will fluoresce in the range of from about 550 to 620 nm. In some cases the fluorescence can be in a range of up to about 1200 nm.

The images can be viewed due to a strong inverse contrast against paper of virtually any color and appears consistently black under UV illumination. The inverse contrast can be expressed as a dimensionless number, being defined as the following ratio:

$$PFR = \frac{\text{Fluorescent Intensity of the Ink} - \text{Fluorescent Intensity of the Background}}{\text{Fluorescent Intensity of the Ink}}$$

Also expressed as: $PFR = \frac{FI_{Ink} - FI_{Background}}{FI_{Ink}}$

Preferably, the inks of the invention will be formulated and printed to achieve a PFR of at least about 0.75 and preferably at least about 0.85. The fluorescent measurements can be determined using a Perkin Elmer LS 50B Fluorescent Spectrophotometer, the machine to machine variation not being of importance due to the expression of the PFR as a ratio. It is an advantage of the invention that the inks of the invention have the ability to utilize conventional color inkjet printers.

The inks of the invention are also advantageous from the standpoint that they exhibit an enhanced print growth when read by inverse contrast means. In other words, the inks will fluoresce in all directions and a reader will "see" an image which has spread somewhat from the actual print boundaries due the tendency for light to scatter. This is unlike the image seen by a reader for reflected light, which receives light only directly reflected from the source. The invention, thus, makes possible methods for reading with enhanced inverse contrast and therefore is able to better provide reliable machine reading. In application of this advantage, the application rate of printed ink can be reduced by greater than 10%, and preferably by from 10 to 50%. In some cases, such as with papers not providing high contrast with black inks and conventional reflectance contrast reading. An example of this aspect of the invention is provided in Example 5 below.

In one aspect, the process of the invention comprises printing an image utilizing an ink composition as described, and then subjecting the ink to short wave ultraviolet radiation and reading the reverse of the printed image by machine reading means. In a preferred form, the machine reading means is programmed with wavelength of emission and predetermined negative contrast values for the ink. And, in a preferred form, the machine reading means is programmed with exponential decay parameters for the ink and compares the fluoresced image to a standard as an additional security attribute in addition to comparison of the wavelength of emission and negative contrast values to predetermined standards. In another specific aspect, the images are read for postal facing and for security verification of IRF printed codes for authentication.

The following Examples are provided to further illustrate and explain preferred invisible inks of the invention and are not to be taken as limiting in any regard. Unless otherwise indicated, all parts and percentages are by weight.

EXAMPLE 1

This example illustrates an invisible red fluorescent ink which was formulated by using the following formulation:
  1.10% Lumilux Red CD 380 fluorophore
  1.98% PVP (Kollidone K-12)
  6.28% BTG (triethylene glycol mono butyl ether)
  9.9% 2-Pyrrolidone
  24.64% Polyethylene Glycol (M.W. 200)
  61.16% Distilled $H_2O$ The ingredients are mixed by simply agitating a mixture for a time suitable to achieve a colorless solution.

The ink exhibits the following properties:

Viscosity=4.1 cp

Surface Tension=40.3 dynes/cm

EXAMPLE 2

This example illustrates formulation of a low-viscosity invisible red fluorescent ink following the procedure of Example 1 from the following components:

1.10% Lumilux Red CD 380 fluorophore 1.60% PVP (Kollidone K-12)

6.00% BTG 6.00% 2-Pyrrolidone 8.00% Polyethylene Glycol (M.W. 200)

77.3% Distilled $H_2O$

The ink exhibits the following properties:

Viscosity=2.2 cp

Surface Tension=39.0 dynes/cm

EXAMPLE 3

This example illustrates formulation of a low-viscosity invisible red fluorescent ink following the procedure of Example 1 from the following components:

1.10% Lumilux Red CD 380 fluorophore 1.98% PVP (Kollidone K-12)

6.28% BTG 9.9% 2-Pyrrolidone 24.64% Polyethylene Glycol (M.W. 200)

56.1% Distilled $H_2O$

The ink exhibits the following properties:

Viscosity=4.1 cp and Surface Tension=46.2 dynes/cm

EXAMPLE 4

This example tests the use of the formulated lower surface tension invisible ink of Example 2 to determine whether or not the print degrades in quality as a function of time and due to the slow penetration in porous envelopes under the intensity of a 8-watt short UV (254 nm) lamp.

EXAMPLE 5

Low Surface Tension Invisible Ink

| Component | Weight (grams) | Weight Percentage |
|---|---|---|
| Lumilux Red CD 380 | 1.096 | 1.082 |
| PVP (Polyvinylpyrrolidone) | 1.97 | 1.945 |
| BTG (Triethylene Glycol Mono Butyl Ether) | 6.26 | 6.17 |
| 2 Pyrrolidone | 9.84 | 9.7202 |
| PEG (Polyethylene Glycol) | 22.04 | 21.76 |
| Surfynol 504, nonionic surfactant | 1.67 | 1.65 |
| Distilled Water | 58.398 | 57.66 |
| Total amount | 101.28 | 100 |

Surface Tension 25 dynes/cm

Low Surface Tension Invisible Ink Envelope B

Procedures:

1. Place a Printed Barcode with the invisible ink under a defined camera setup.

2. Take periodical readings using the DMx Verifier to test the readability of the print.

3. Run this experiment for a total of five hours

4. Show results of the Print Quality as a function of time.

DATA: Print Contrast Versus Time data is shown in the graph in FIG. 4.

The main conclusion drawn in this experiment was the fact that the percent contrast does decrease as a function of time due to two reasons: 1) luminescence decay which can be delayed fluorescence or short lived phosphorescence (1 $\mu$sec to 100 ms) and 2) slow penetration of the low viscosity ink into the paper. It looks to decrease as an exponential decay. This behavior may allow the use of predictable decay time as important security information encoded in the images produced with this ink. This information, available with the inks of this invention, can be used for verification of authenticity.

EXAMPLE 6

Following is a table with the comparative information about the invisible and black ink printed at relative low resolution (160 dpi). As can be seen, the invisible ink has better modulation values due to the better fill of the ink. This is due to the nature of fluorescence (optical bleeding or scattering that gives the impression of better coverage of the "hills and valleys" of the paper and therefore stronger signal.

| Ink Type | Envelope Type | Decode Grade | Modulation Grade | Symbol Contrast Grade | Axial Nonuniformity Grade | Unused Error Correction Codes Grade | Overall Grade |
|---|---|---|---|---|---|---|---|
| Invisible Ink | A | 4 | 4 | 4 | 4 | 4 | 4 |
| Invisible Ink | B | 4 | 4 | 4 | 4 | 4 | 4 |
| Invisible Ink | I | 4 | 4 | 1 | 4 | 4 | 1 |
| Invisible Ink | L | 4 | 4 | 4 | 4 | 4 | 4 |
| High Surface Tension Blk Ink | A | 4 | 3 | 4 | 4 | 4 | 3 |
| High Surface | B | 4 | 3 | 4 | 4 | 4 | 3 |

-continued

| Ink Type | Envelope Type | Decode Grade | Modulation Grade | Symbol Contrast Grade | Axial Nonuniformity Grade | Unused Error Correction Codes Grade | Overall Grade |
|---|---|---|---|---|---|---|---|
| High Surface Tension Blk Ink | I | 4 | 0 | 3 | 4 | 0 | 0 |
| High Surface Tension Blk Ink | L | 4 | 2 | 3 | 4 | 4 | 2 |
| Low Surface Tension Blk Ink | A | 4 | 2 | 3 | 4 | 4 | 2 |
| Low Surface Tension Blk Ink | B | 4 | 2 | 4 | 4 | 4 | 2 |
| Low Surface Tension Blk Ink | I | 4 | 1 | 3 | 4 | 4 | 1 |
| Low Surface Tension Blk Ink | L | 4 | 2 | 3 | 4 | 4 | 2 |

Grading Base:
Grading of the barcodes is based on ISO/IEC 15415.8 Barcode symbol quality test specification—Two dimensional symbols

| Parameter Grade | Decode | Symbol Contrast | Axial Non-Uniformity | Modulation | Unused Error Correction |
|---|---|---|---|---|---|
| 4 (A) | Passes | SC ≥ 0.70 | AN ≤ 0.06 | MOD ≥ 0.50 | UEC ≥ 0.62 |
| 3 (B) |  | SC ≥ 0.55 | AN ≤ 0.08 | MOD ≥ 0.40 | UEC ≥ 0.50 |
| 2 (C) |  | SC ≥ 0.40 | AN ≤ 0.10 | MOD ≥ 0.30 | UEC ≥ 0.37 |
| 1 (D) |  | SC ≥ 0.20 | AN ≤ 0.12 | MOD ≥ 0.20 | UEC ≥ 0.25 |
| 0 (F) | Fails | SC < 0.20 | AN > 0.12 | MOD < 0.20 | UEC < 0.25 |

Using a postage meter (160×480 dpi) barcodes were printed with 3 different inks, a high surface tension black ink, a low surface tension black ink, and a low surface tension invisible ink. The barcodes were then scanned with a CCD Camera at 250 DPI, using Acuity CiMatrix DMX Verifier+software.
An overall grade is based on the lowest barcode attribute measured. As can bee seen in the table, the limited factor in our case is the modulation.
Modulation is a measure of the uniformity of the reflectance of the dark and light modules of a 2D Datamatrix symbol. Modulation, if excessive, may reduce the probability of a module being correctly identified as dark or light. Clearly using an invisible ink gives an advantage as reading a fluorescent (inverse) image shows much greater uniformity.

EXAMPLE 7

This example illustrates the effect of a surfactant on lowering the surface tension of an invisible red fluorescent ink of the invention having the following basic formulation:

1.09% Lumilux Red CD 380 fluorophore
1.97% PVP (Kollidone K-12)
6.25% BTG (triethylene glycol mono butyl ether)
9.85% 2-Pyrrolidone
22.03% Polyethylene Glycol (M.W. 200)
58.31% Distilled $H_2O$ Several formulations were prepared using the above and adding small amounts of Surfynol 504 and adjusting the other components, to provide the a series of inks having the following amounts of the surfactant and surface tension readings:

| Sample Number | Concentration of Surfactant | Surface Tension (dynes per cm) |
|---|---|---|
| 1 | 0.0000% | 40.0 |
| 2 | 0.5033% | 32.2 |
| 3 | 0.5506% | 32.1 |
| 4 | 1.0047% | 30.2 |
| 5 | 1.6513% | 25.0 |

Tests showed that the surface tension of he inks of the invention can be lowered without diminishing the fluorescent characteristics of the inks. Prints made with the higher surface tension inks of the above formulations had better contrast, lower size offset and lower print growth than the lower surface tension inks.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A low viscosity, penetrating invisible inkjet exhibiting a viscosity of from 1 to 5 centipoises and a surface tension of between 30–45 dynes/cm, and composition comprising: a penetrating liquid vehicle comprising water having dissolved therein a water-soluble organic fluorescent fluorophore comprising a rare earth complex which fluoresces when irradiated with short wave length UV radiation in the range from 230 nm to 280 nm.

2. An invisible ink according to claim 1 which further comprises:

materials in effective amounts to aid in fluorophore solubilization, paper penetration and/or drying.

3. An invisible ink according to claim 1 which further comprises:

polar solvent, surface active agent and humectant ingredients.

4. An invisible ink according to claim 1 wherein the fluorophore comprises a water-soluble organometallic compound containing complexed ligand and a rare earth element.

5. An invisible ink according to claim 1 wherein the ink will fluoresce in the range of from 610 to 630 nm.

6. An invisible ink according to claim 1 wherein the ink will fluoresce in the range of from 550 to 650 nm.

7. An invisible ink according to claim 1 wherein the ink will fluoresce in the range of from 550 to 620 nm.

8. An invisible ink according to claim 1 wherein the ink will fluoresce at less than 1200 nm.

9. An invisible ink according to claim 8, wherein the rare earth element comprises europium or terbium.

10. An invisible ink according to claim 9 which further comprises:

materials in effective amounts to aid in fluorophore solubilization, paper penetration and/or drying comprising a component selected from the group consisting of a polar solvent, a surface active agent and a humectant.

11. An invisible ink according to claim 10 wherein the ink will fluoresce in the range of from 550 to 650 nm.

12. A low viscosity, penetrating invisible inkjet composition, exhibiting a viscosity of from 1 to 5 centipoises and a surface tension of between 30–45 dynes/cm, capable of printing images by ink jet printing comprising:

water;

at least one water-soluble organic fluorescent fluorophore comprising a rare earth complex comprising europium or terbium, which fluoresces in the range of from 550 to 650 nm when irradiated with short wave length UV radiation in the range from 230 nm to 280 nm; and materials in effective amounts to aid in fluorophore solubilization, paper penetration and/or drying comprising a component selected from the group consisting of a polar solvent, a surface active agent and a humectant, the amounts being employed proportionally to enable ink jet printing on a substrate having a Sheffield porosity under 166.

13. A process comprising:

printing an image utilizing a low viscosity, penetrating invisible inkjet ink composition exhibiting a viscosity of from 1 to 5 centipoises and a surface tension of between 30–45 dynes/cm comprising water and a water-soluble organic fluorescent fluorophore comprising a rare earth complex which fluoresces when irradiated with short wave length UV radiation in the range from 230 nm to 280 nm;

and then subjecting the ink to short wave ultraviolet radiation and reading the reverse of the printed image by machine reading means.

14. A process according to claim 13, wherein the machine reading means is programmed with wavelength of emission and predetermined negative contrast values for the ink.

15. A process according to claim 14, wherein the machine reading means is programmed with exponential decay parameters for the ink and compares the fluoresced image to a standard as an additional security attribute in addition to comparison of the wavelength of emission and negative contrast values to predetermined standards.

16. A process according to claim 13, wherein the images are read for postal facing and for security verification of IRF printed codes for authentication.

17. A process comprising:

printing an image utilizing a low viscosity, penetrating invisible inkjet ink composition comprising water; at least one water-soluble organic fluorescent fluorophore comprising a rare earth complex comprising europium or terbium, which fluoresces in the range of from 550 to 650 nm when irradiated with short wave length UV radiation in the range from 230 nm to 280 nm; and materials in effective amounts to aid in fluorophore solubilization, paper penetration and/or drying comprising a component selected from the group consisting of a polar solvent, a surface active agent and a humectant, the amounts being employed proportionally to enable ink jet printing; and then subjecting the ink to short wave ultraviolet radiation and reading the reverse of the printed image by machine reading means.

18. A process according to claim 17, wherein the machine reading means is programmed with wavelength of emission and predetermined negative contrast values for the ink.

19. A process according to claim 18, wherein the machine reading means is programmed with exponential decay parameters for the ink and compares the fluoresced image to a standard as an additional security attribute in addition to comparison of the wavelength of emission and negative contrast values to predetermined standards.

20. A process according to claim 17, wherein the images are read for postal facing and for security verification of IRF printed codes for authentication.

* * * * *